(12) United States Patent
Komaki (10) Patent No.: US 8,358,939 B2
(45) Date of Patent: Jan. 22, 2013

(54) OPTICAL COMMUNICATION DEVICE

(75) Inventor: Kosuke Komaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 377 days.

(21) Appl. No.: 12/845,291

(22) Filed: Jul. 28, 2010

(65) Prior Publication Data

US 2011/0026940 A1  Feb. 3, 2011

(30) Foreign Application Priority Data

Jul. 30, 2009  (JP) ................. 2009-178128

(51) Int. Cl.
   *H04B 10/06*  (2006.01)
   *H04K 9/00*   (2006.01)
   *H04L 27/00*  (2006.01)
   *H04L 7/02*   (2006.01)

(52) U.S. Cl. ......... 398/202; 375/316; 375/325; 375/359

(58) Field of Classification Search .............. 398/202, 398/208; 375/293, 359, 369, 316–352
   See application file for complete search history.

(56) References Cited

U.S. PATENT DOCUMENTS

| | | | | |
|---|---|---|---|---|
| 4,122,448 A * | 10/1978 | Martin | ............... | 342/174 |
| 6,016,080 A * | 1/2000 | Zuta et al. | ............... | 331/25 |
| 6,307,868 B1 * | 10/2001 | Rakib et al. | ............... | 370/485 |
| 6,639,939 B1 * | 10/2003 | Naden et al. | ............... | 375/140 |
| 7,352,835 B1 * | 4/2008 | Asaduzzaman et al. | ...... | 375/359 |
| 2002/0015423 A1 * | 2/2002 | Rakib et al. | ............... | 370/485 |
| 2009/0190926 A1 * | 7/2009 | Charlet et al. | ............... | 398/74 |
| 2009/0304061 A1 * | 12/2009 | Kamalizad et al. | .......... | 375/228 |

FOREIGN PATENT DOCUMENTS

| | | | |
|---|---|---|---|
| JP | 05-308325 | * | 11/1993 |
| JP | 05-308325 A | | 11/1993 |
| JP | 2008-278249 | * | 11/2008 |
| JP | 2008-278249 A | | 11/2008 |

OTHER PUBLICATIONS

A BPSK/QPSK Timing-Error Detector for Sampled Receivers, Floyd M, Gardner, Fellow, IEEE, vol. 34, No. 5, May 1986.*
Gardner, F. M. "A BPSK/QPSK Timing-Error Detector for Sampled Receivers", IEEE Transactions on Communications, vol. COM-34, No. 5, May 1986, pp. 423-429.

* cited by examiner

*Primary Examiner* — Kenneth N Vanderpuye
*Assistant Examiner* — Abbas H Alagheband
(74) *Attorney, Agent, or Firm* — Fujitsu Patent Center (57) ABSTRACT

An optical communication device using a digital coherent reception system includes a phase detector configured to generate, based on a signal obtained in a course of digital signal processing, a phase signal indicating a displacement of a sampling of a reception signal, a clock switch-determiner configured to switch from an reference clock to a clock of transferred data when a value of an amplitude of the phase signal exceeds a given threshold value, and a selector configured to synchronize the sampling of the reception signal and an internal clock of the digital signal processing with the reference clock at start time or signal loss time, and synchronize the sampling of the reception signal and the internal clock with the line clock of the reception signal except for the start time and the signal loss time.

9 Claims, 10 Drawing Sheets

OPTICAL COMMUNICATION DEVICE

CROSS-REFERENCE TO RELATED APPLICATIONS

This application is based upon and claims the benefit of priority of the prior Japanese Patent Application No. 2009-178128, filed on Jul. 30, 2009, the entire contents of which are incorporated herein by reference.

FIELD

The embodiments discussed herein are related to the technology of digital coherent reception performed to support optical communication.

BACKGROUND

Hitherto, direct detection systems have been mainly used as known optical communication reception systems. For performing the ultrahigh speed optical communication, however, the digital coherent reception performed through local light oscillation and an analog digital converter (ADC) to resolve the lack of an optical signal noise ratio (OSNR) and a linear distortion occurring due to the wavelength dispersion or the like has become increasingly mainstream.

Since communications are performed with an ultrahigh speed, a small margin of hardware is provided to perform oversampling by using a sampling frequency of the ADC. Therefore, sampling should be performed at appropriate time to attain proper signal quality.

Figure 1:
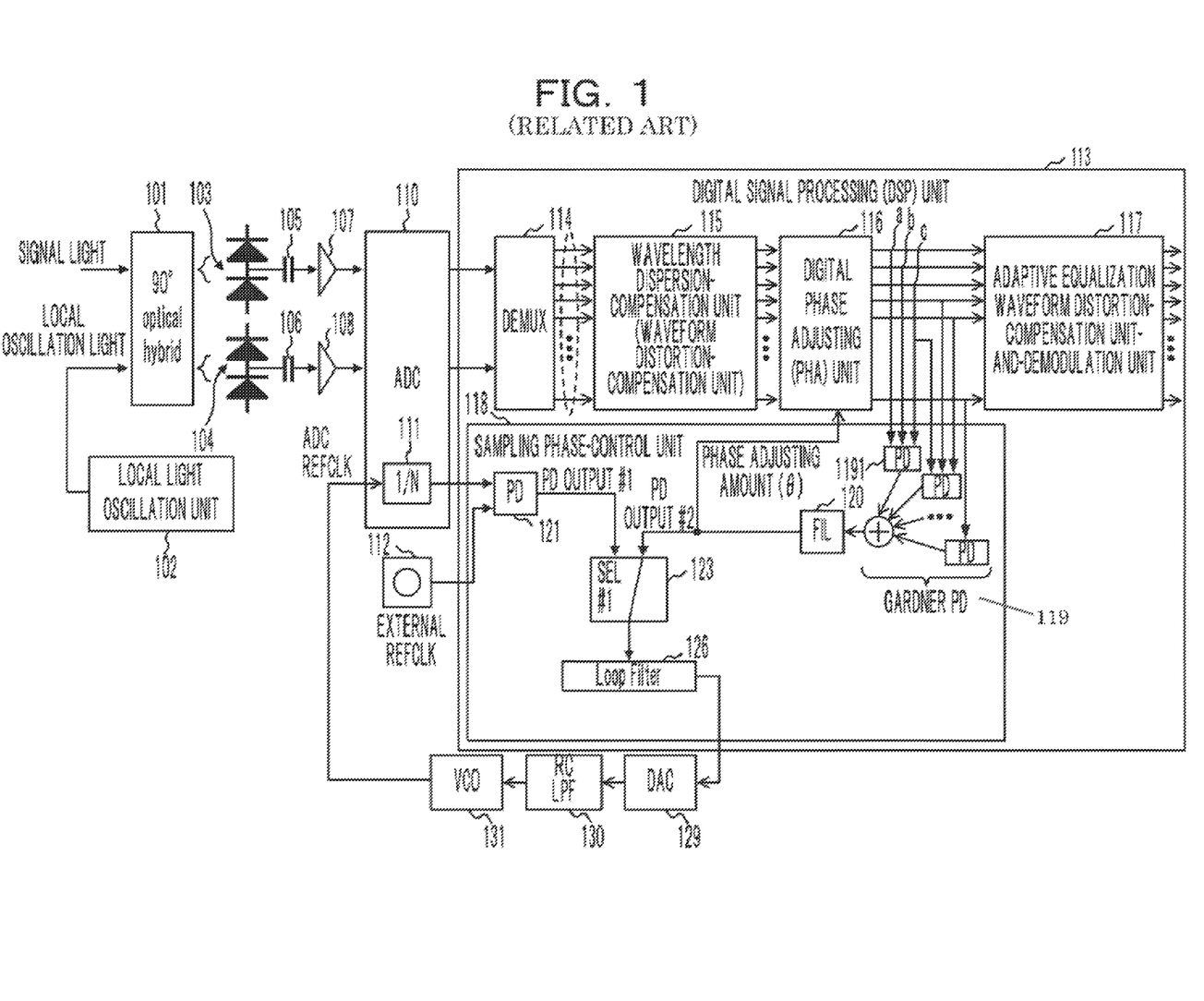
FIG. 1 illustrates an exemplary configuration provided to perform digital coherent reception.

FIG. 1 illustrates an exemplary configuration provided to attain the digital coherent reception in a related art. According to the above-described exemplary configuration, minimal sampling is performed, that is to say, the sampling is performed twice per a single symbol. Further, a deviation from appropriate sampling is observed through a Gardner phase detector (PD) and the deviation is fed back to perform the sampling at appropriate time.

Quadrature phase shift keying (QPSK) modulation will be exemplarily described with reference to FIG. 1. Namely, a transmitted signal light and a local oscillation light generated through a local light oscillator 102 are transmitted to a 90°-optical hybrid unit 101 and optical output signals (signals i and q) having a phase difference of 90° therebetween are converted into electrical signals via individual photoelectric converters 103 and 104. The electrical signals are amplified through electronic amplifiers 107 and 108 via alternating current (AC) couplers 105 and 106, and are transmitted to an analog digital converter (ADC) 110.

The ADC 110 samples the signals that are transmitted from the electronic amplifiers 107 and 108 based on a signal obtained by internally doubling a clock (ADC REFCLK) transmitted from a voltage-controlled oscillator (VCO) 131 and digitizes the sampled signals. Further, the ADC 110 outputs a signal obtained by subjecting the clock (ADC REFCLK) transmitted from the VCO 131 to frequency division performed through a frequency divider 111 as a clock of a digital signal processor (DSP) 113.

The DSP 113 distributes and outputs digital signals of two systems (e.g., 6-bit parallel signals) in chorological order for each of the systems through the demultiplexer 114, where the digital signals correspond to the signals i and q that are transmitted from the ADC 110. For example, the upper half and the lower half of a signal output from the demultiplexer 114 correspond to the individual signal i and signal q. Further, digital signals (each of the digital signals is, for example, a 6-bit signal) are individually assigned to the output signals in time sequence. The time difference between adjacent output signals corresponds to the time difference between sampling intervals.

The signal output from the demultiplexer 114 is transmitted to a wavelength dispersion-compensator 115 for wavelength dispersion-compensation, and a signal output from the wavelength dispersion-compensator 115 is transmitted to a digital phase adjuster (PHA) 116 for digital phase adjusting. Then, a signal output from the digital PHA 116 is transmitted to an adaptive equalization-waveform distortion-compensator-and-demodulator 117 for waveform distortion-compensation and demodulation.

Figure 2:
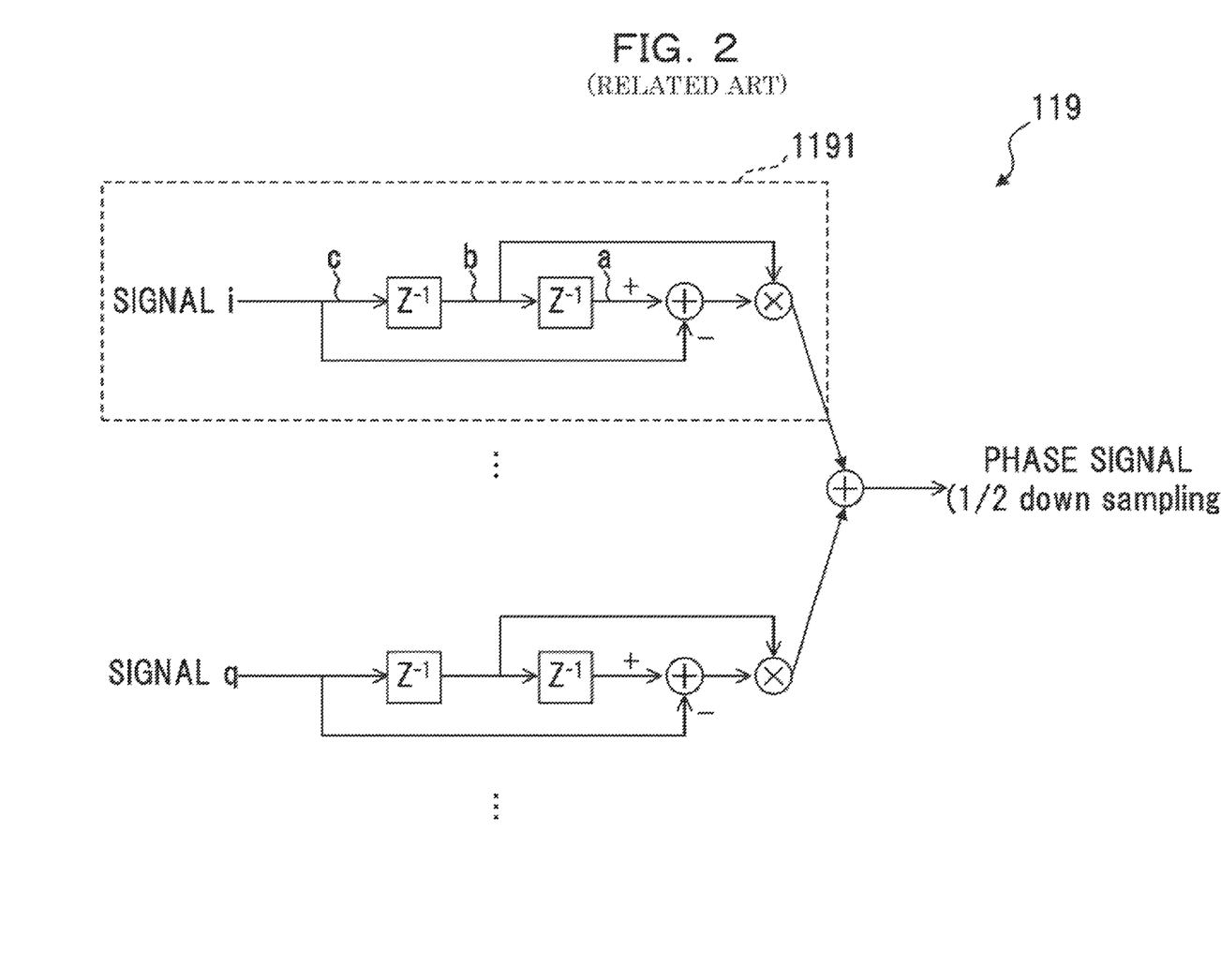
FIG. 2 illustrates the signal-to-signal relationship for a Gardner phase detector.

On the other hand, the signal output from the digital PHA 116 is transmitted to a Gardner phase detector 119 of a sampling phase-controller 118. FIG. 2 illustrates the signal-to-signal relationship for the Gardner phase detector 119 in the related art. The symbol $Z^{-1}$ indicates a delay element of the symbol 1/2 and corresponds to the time difference between the adjacent outputs of the digital PHA 116 (illustrated in FIG. 1). For example, signal points a, b, and c that are defined in an element 1191 of the Gardner phase detector 119 individually correspond to signal points a, b, and c of the digital PHA 116 illustrated in FIG. 1. In FIG. 2, substantially the same calculation as done in the element 1191 is performed for the signals corresponding to the signals i and q in terms of time, and the sum total of the calculation results is calculated to output a phase signal.

Returning to FIG. 1, the signal output from the Gardner phase detector 119 is fed back to the digital PHA 116 as a phase adjusting amount (θ) via the filter 120, and the output signal is given as a control signal of the above-described VCO 131 via a selector 123, a loop filter 126, a digital analog converter (DAC) 129, and a low-pass filter 130 in sequence. Namely, the impact of high-speed jitter and/or fluctuations of local oscillation light are fed back to the digital PHA 116 including a finite impulse response (FIR) filter and is removed. Further, a deviation from low-speed sampling, such as a wander, is fed back to the clock itself of the ADC 110 through the VCO 131 and is removed. Consequently, the number of stages of the FIR filter is decreased.

When the clock of the ADC 110 and the internal clock of the DSP 113 are not frequency-synchronized with the clock of transferred data (LINE-side CLK), correction processor including the wavelength dispersion or the like is displaced. When the frequency synchronism is not attained, the value of a signal output from the Gardner phase detector 119 is reduced with reference to the actual phase. Namely, since the waveform is not shaped, the level of each of sampled data items becomes random so that the sampled data items counteract each other at the sum-total calculation time. Consequently, the value of the output signal of the Gardner phase detector 119 is reduced.

At the starting (boot-up) time, therefore, the clock of the DSP 113 is temporarily frequency-synchronized with a reference clock (external REFCLK) with a precision of, for example, ±20 ppm, the reference clock including a quartz oscillator or the like. After that, the synchronism is switched to the clock of transferred data (LINE-side CLK). In FIG. 1, the external reference clock-generator 112 corresponds to the above-described reference clock (external REFCLK) and performs the phase detection through the phase detector 121 in conjunction with a clock transmitted from the frequency divider 111 of the ADC 110. Then, at the starting time, the selector 123 is set on the phase detector 121-side so that a loop including the loop filter 126, the DAC 129, the low-pass filter 130, the VCO 131, the frequency divider 111, and the phase detector 121 is formed. Further, the clock of the DSP 113 is synchronized with the external REFCLK of the external reference clock-generator 112.

Since the transferred data itself disappears at the loss of signal (LOS) time during the normal operations, the switch-back to the reference clock (external REFCLK) is made. After the LOS is released, the switch to the clock of the transferred data (LINE-side CLK) is made.

Thus, during the digital coherent reception, the frequency synchronism with the reference clock (external REFCLK) is temporarily achieved at the starting time and the signal loss-time. After that, the switch to the clock of the transferred data (the LINE-side CLK) is made. However, what should be the trigger of making the switch is to be determined.

According to the known direct detection, the signal of direct current (DC) level-input light acquired from a signal light and/or that of alternating current (AC) level-input light acquired through the peak detector or the like is used as the above-described trigger. According to the known direct detection, the waveform is shaped on the transmission path. Therefore, the waveform had already been shaped at the reception device-input time so that a clock is generated based on the shaped waveform. Consequently, the clock is switched to the LINE-side at the time when an input signal is transmitted. When the switch-back to the reference clock is made due to the signal loss during the normal operations, an input waveform is also shaped at the time when an input signal is transmitted. Therefore, the clock may be reproduced in a relatively short time so that the recovery time is reduced even though the switch-back is made.

During the digital coherent reception, however, a clock toward the ADC affects not only sampling data but also various types of signal processor performed through the DSP, the signal processor including dispersion compensation or the like synchronized with the above-described clock. Consequently, the waveform is distorted, which makes it difficult to properly perform the phase detection. Therefore, when the switch to the LINE-side is made due to mere input, there is a possibility that the synchronism is delayed. Further, it may also become difficult to attain the pull-in. In that case, it may take a longer time to make the switch to the asynchronous-side again.

Further, there has been the technology of maintaining a clock frequency obtained immediately before the signal loss occurrence by maintaining the control voltage of the voltage-controlled oscillator (refer to Patent Document 2, for example). However, even though the above-described technology is used, the output frequency of the voltage-controlled oscillator fluctuates due to a temperature drift or the like so that the input waveform is not properly shaped. Consequently, it may become difficult to perform the phase detection and attain the LINE-side synchronism even though the signal loss is released.

SUMMARY

According to an aspect of the embodiments, an optical communication device using a digital coherent reception system includes a phase detector configured to generate, based on a signal obtained in a course of digital signal processing, a phase signal indicating a displacement of a sampling of a reception signal, a clock switch-determiner configured to switch from an reference clock to a clock of transferred data when a value of an amplitude of the phase signal exceeds a given threshold value, and a selector configured to synchronize the sampling of the reception signal and an internal clock of the digital signal processing with the reference clock at start time or signal loss time, and synchronize the sampling of the reception signal and the internal clock with the line clock of the reception signal except for the start time and the signal loss time.

The object and advantages of the invention will be realized and attained by at least the features, elements, and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, various embodiments of the present invention will be described with reference to the attached drawings. In the drawings, dimensions and/or proportions may be exaggerated for clarity of illustration. It will also be understood that when an element is referred to as being "connected to" another element, it may be directly connected or indirectly connected, i.e., intervening elements may also be present. Further, it will be understood that when an element is referred to as being "between" two elements, it may be the only element layer between the two elements, or one or more intervening elements may also be present.

Figure 3:
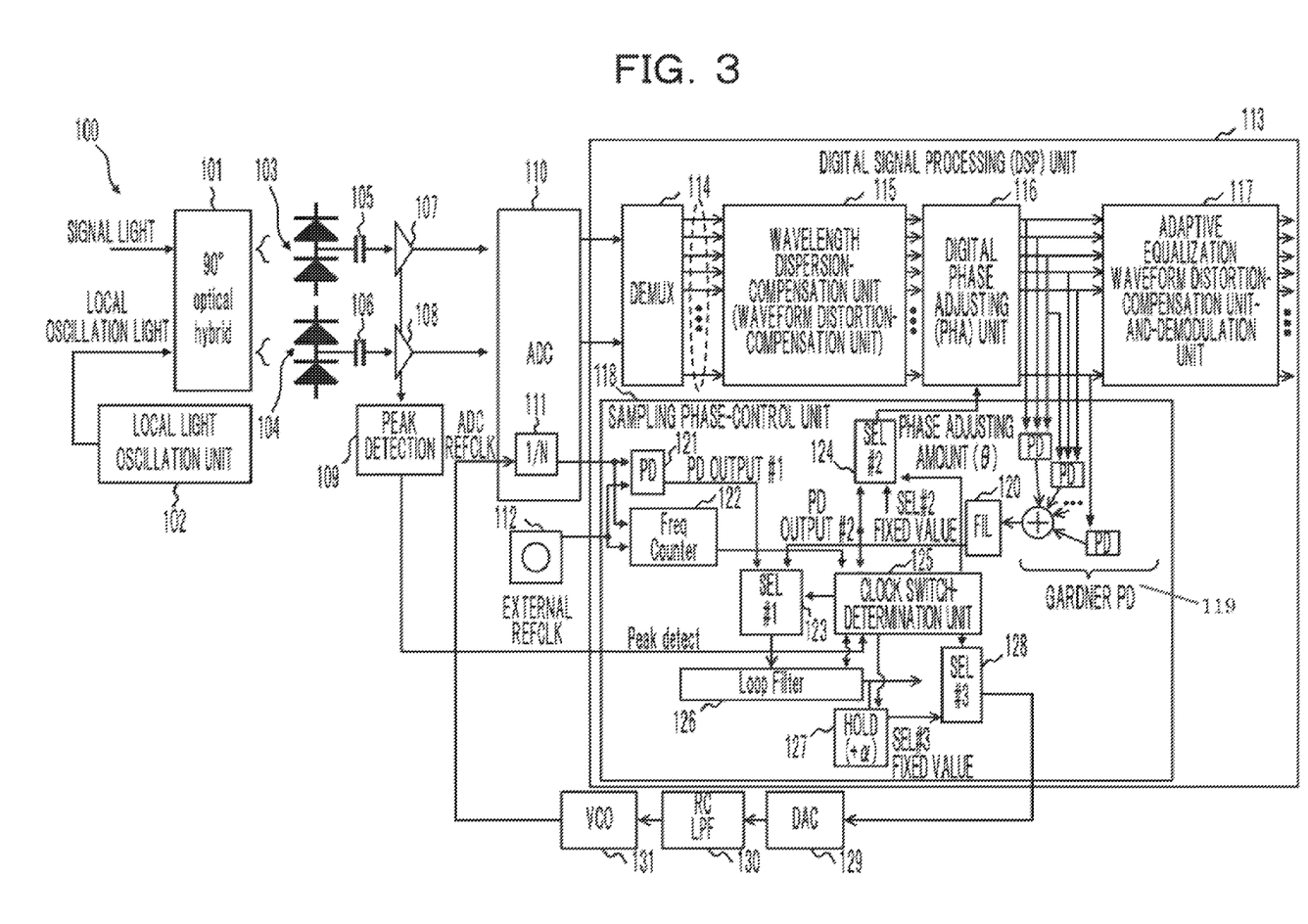
FIG. 3 illustrates an exemplary configuration of a receptor of an optical communication device according to an embodiment.

FIG. 3 illustrates an exemplary configuration of a receptor of an optical communication device according to an embodiment.

In FIG. 3, an optical communication device 100 includes a 90°-optical hybrid unit 101, a local light oscillator 102, photoelectric converters 103 and 104, alternating current (AC)-couplers 105 and 106, electronic amplifiers 107 and 108, a peak detector 109, and an analog digital converter (ADC) 110. Further, the optical communication device 100 includes an external reference clock-generator 112, a digital signal-processor (DSP) 113, a digital analog converter (DAC) 129, a low-pass filter 130, and a voltage-controlled oscillator (VCO) 131.

Upon receiving a signal light and a local oscillation light generated through the local light-oscillator 102, the 90°-optical hybrid unit 101 outputs optical signals (signals i and q) having a phase difference of 90° therebetween, and the photoelectric converters 103 and 104 convert the individual signals i and q into electrical signals that are transmitted to the individual electronic amplifiers 107 and 108 via the individual AC couplers 105 and 106 so that the electrical signals are amplified. When the output level (AC level) of each of the electronic amplifiers 107 and 108 exceeds a specified threshold value, the peak detector 109 outputs a detection signal (Peak detect). Upon receiving output signals transmitted from the individual electronic amplifiers 107 and 108, the ADC 110 samples the output signal based on a signal (a several-tens-of-GHz clock) obtained by internally doubling a clock (ADC REFCLK) transmitted from the VCO 131, digitizes the sampled signal, and outputs the digitized sampled signal. Further, the ADC 110 outputs a signal obtained by subjecting the clock (ADC REFCLK) transmitted from the VCO 131 to frequency division performed through a frequency divider 111 as a clock of the DSP 113.

The DSP 113 includes a demultiplexer 114, a wavelength dispersion compensator 115, a digital phase adjuster (PHA) 116, and an adaptive equalization-waveform distortion-compensator-and-demodulator 117, and a sampling phase-controller 118.

The demultiplexer 114 distributes and outputs digital signals of two systems (e.g., 6-bit parallel signals) in chorological order for each of the systems, where the digital signals correspond to the signal i and the signal q that are transmitted from the ADC 110. The upper half of the signal that had been output from the demultiplexer 114 is made to correspond to the signal i and the lower half thereof is made to correspond to the signal q, for example. Further, digital signals (each of the digital signals is, for example, a 6-bit signal) are individually assigned to the output signals in time sequence. The time difference between adjacent output signals corresponds to the time difference between sampling intervals.

Upon receiving the signal output from the demultiplexer 114, the wavelength dispersion compensator 115 performs the wavelength dispersion compensation (compensation for the waveform distortion occurring due to the wavelength dispersion occurring in an optical transmission path). Upon receiving the signal output from the wavelength dispersion compensator 115, the digital PHA 116 performs digital PHA (compensation for jitter or the like). Upon receiving the signal output from the digital PHA 116, the adaptive equalization-waveform distortion-compensator-and-demodulator 117 performs the waveform distortion compensation and the signal demodulation.

On the other hand, the sampling phase-controller 118 includes a Gardner phase detector (Gardner PD) 119, a filter 120, a phase detector (PD) 121, a frequency counter (Freq Counter) 122, selectors 123, 124, and 128, a clock switch-determiner 125, a loop filter 126, and a fixed value-generator 127.

The PD 121 detects the phase of a clock transmitted from the frequency divider 111 of the ADC 110 and that of a clock (external REFCLK) transmitted from the external clock-generator 112 (the phase comparison), and outputs a PD output #1. On the other hand, the Gardner PD 119 outputs a phase signal from the output of the digital PHA 116 and the phase signal becomes a PD output #2 through the filter 120. The selector (SEL#1) 123 selects the PD output #1-side at the starting time and/or the LOS time under the control of the clock switch-determiner 125, and forms a loop along the loop filter 126, the selector 128, the DAC 129, the low-pass filter 130, the VCO 131, and the ADC 110 so that the ADC REFCLK signal is synchronized with an external REFLK of the external clock-generator 112. The external clock-generator 112 generates a clock with a specified frequency, the clock having a precision of about ±20 ppm. Since the symbol rate attained on the transmission side corresponds to the precision of about ±20 ppm, synchronism with the above-described external REFLK allows for compensating for the waveform distortion through the digital waveform distortion compensation even though LINE synchronism is not attained. At the normal operation time, the selector (SEL#1) 123 selects the PD output #2-side so that the ADC REFCLK is synchronized with a LINE-side CLK.

Further, the selector (SEL#2) 124 selects the PD output #2 and/or data of a fixed value (SEL#2-fixed value) transmitted from the filter 120 under the control of the clock switch-determiner 125, and outputs the selected signal and/or fixed-value data to the digital PHA 116 provided to absorb jitter, as data of a phase adjusting amount (θ).

The frequency counter 122 counts the clock output from the frequency divider 111 with a precision of about ±1 ppm, for example, through the external REFLK transmitted from the external clock generator 112. The clock switch-determiner 125 makes a determination based on the counting result and the detection signal transmitted from the peak detector 109.

The fixed value-generator 127 maintains and outputs data of a value, where the value data is output from the loop filter 126 at arbitrary time, under the control of the clock switch-determiner 125. Further, the fixed value-generator 127 adds and/or delete a fixed value to and/or from the above-described value.

The selector (SEL#3) 128 selects an output signal and/or data of a fixed value (SEL#3-fixed value) transmitted from the loop filter 126 under the control of the clock switch-determiner 125, and outputs the selected output signal and/or fixed-value data to the DAC 129. Here, the loop filter 126 is configured to arbitrarily set an initial value (integral) under the control of the clock switch-determiner 125.

Figure 4:
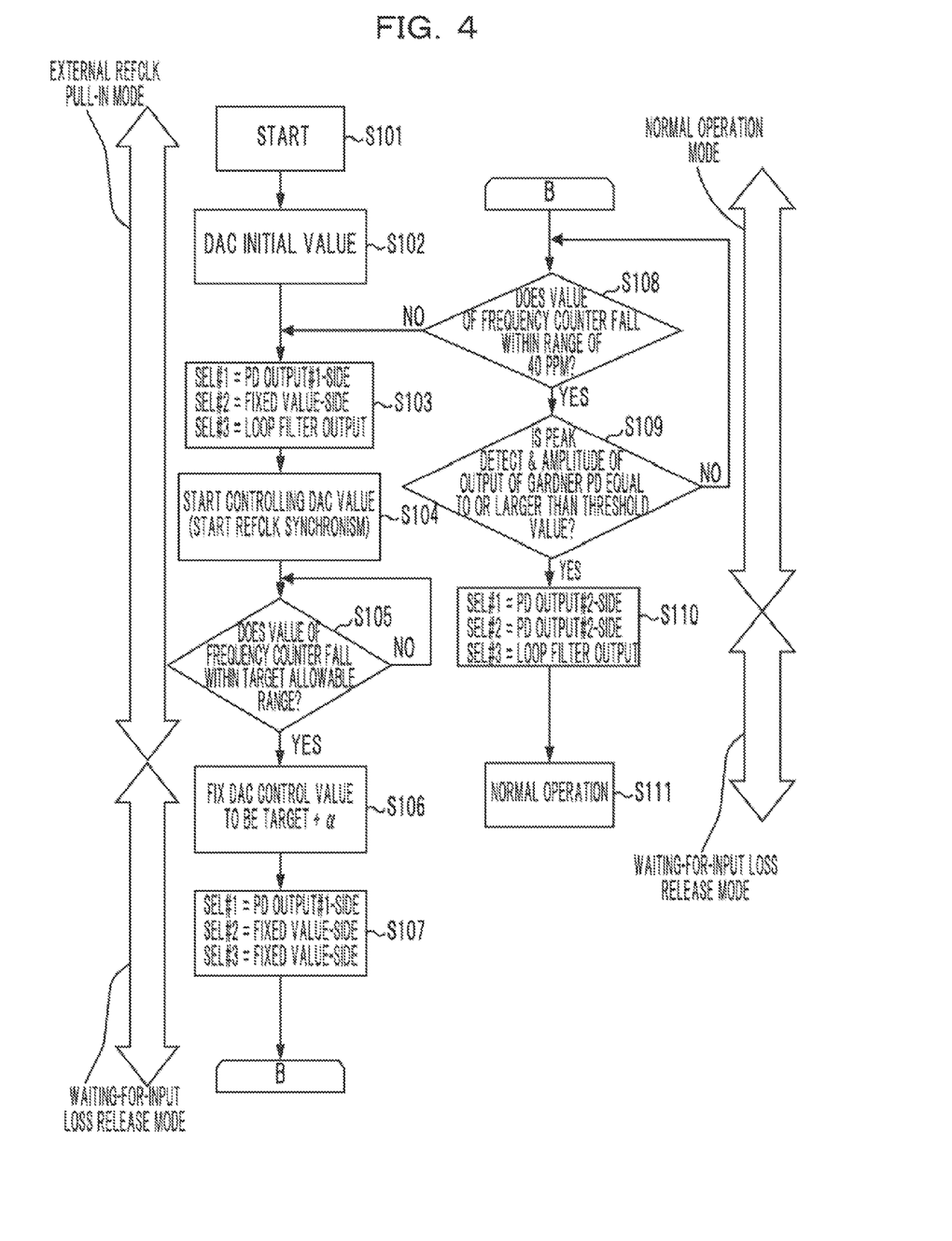
FIG. 4 is a flowchart (Part 1) illustrating exemplary processes that are performed at the starting time.

FIG. 4 is a flowchart (Part 1) illustrating exemplary processes that are performed at the starting time.

In FIG. 4, the optical communication device 100 is started (operation S101), and the sampling phase-controller 118 sets an initial value to the loop filter 126 as an initial value of the DAC 129 (operation S102).

Figure 5:
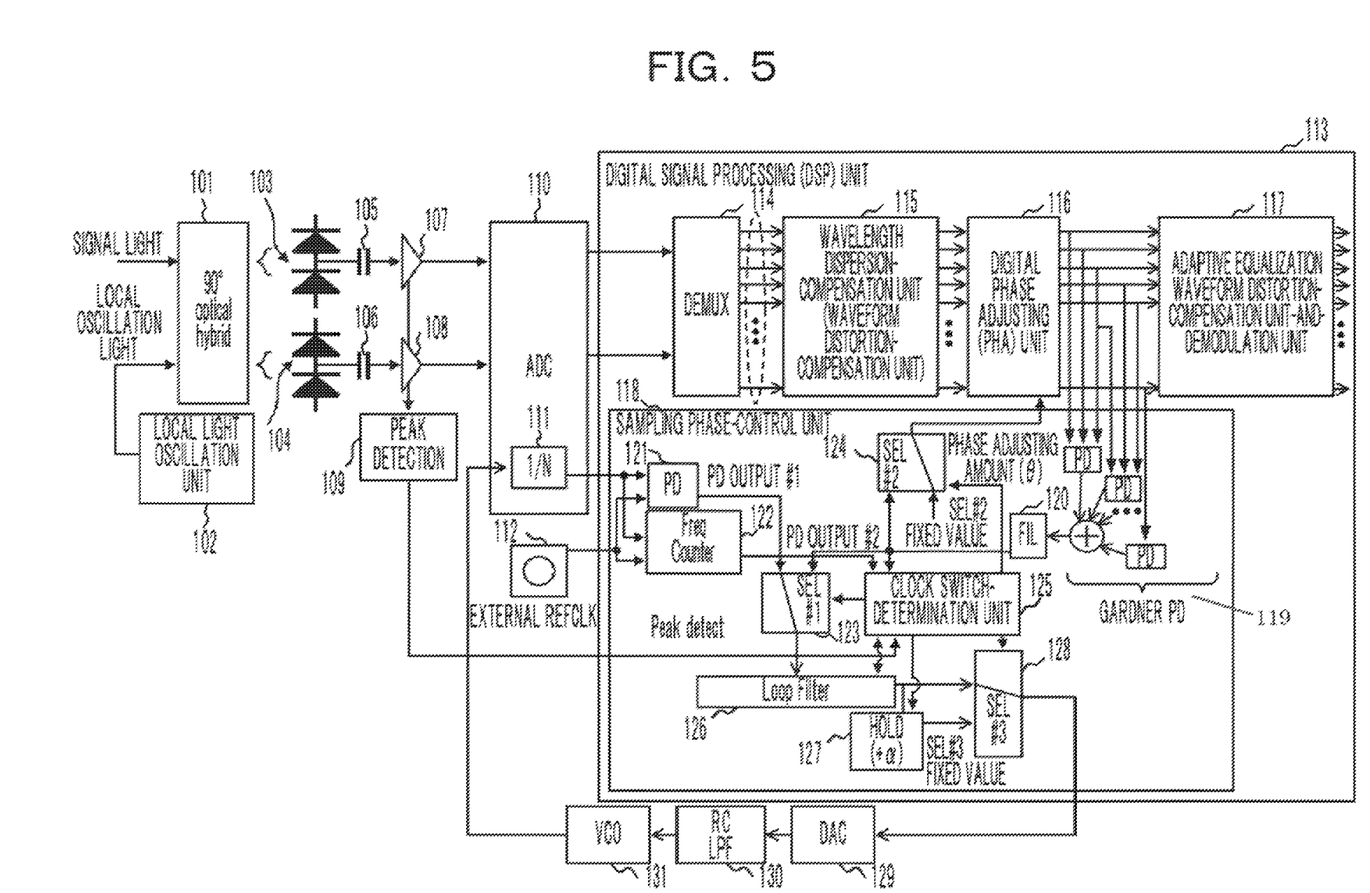
FIG. 5 illustrates the signal flow observed at the starting time.

Next, the sampling phase-controller 118 determines to set the selector (SEL#1) 123 on the PD output #1-side, the selector (SEL#2) 124 on the fixed value-side, and the selector (SEL#3) 128 on the loop filter 126's output-side (operation S103). FIG. 5 illustrates the signal flow attained in the above-described state. Namely, the value of a signal output from the Gardner PD 119 is zero at the starting time (LOS time), and the ADC 110 and the DSP 113 are synchronized with the external REFCLK to keep the sensitivity of the Gardner PD 119 when a signal light enters. Further, since a signal output from the Gardner PD 119 is changed due to an operation of the digital PHA 116 provided to absorb jitter, the selector (SEL#2) 124 is set on the fixed value-side and the amount of adjustment for the digital PHA 116 is fixed at zero.

Returning to FIG. 4, the sampling phase-controller 118 starts controlling the value of the DAC 129, that is, the REFCLK synchronism (operation S104).

First, the sampling phase-controller 118 determines whether or not the value of the frequency counter 122 falls within a target allowable range (operation S105). When the value does not fall within the target allowable range (when the answer is No at operation S105), the above-described determination is made again.

When the value falls within the target allowable range (when the answer is Yes at operation S105), the sampling phase-controller 118 fixes the control value of the DAC 129 at a target value +α through the fixed value-generator 127 (operation S106).

Next, the selector (SEL#1) 123 is set on the PD output #1-side, and each of the selector (SEL#2) 124 and the selector (SEL#3) 128 is set on the fixed value-side (operation S107). If the phase of the REFCLK agrees with that of the LINE-side CLK, the value of a signal output from the Gardner PD 119 becomes zero. Therefore, for attaining the phase detection with stability, synchronism with the external REFCLK is temporarily achieved, and the fixed value-generator 127 determines the value of the VCO 131 to be a value which is slightly displaced from a control voltage value obtained when the synchronism with the external REFCLK is attained (e.g., ±20 ppm+α) and the selector (SEL#3) 128 is set on the fixed value-side.

Next, the sampling phase-controller 118 determines whether or not the value of the frequency counter 122 falls within a range of ±40 ppm (operation S108). When the value does not fall within the range of ±40 ppm (when the answer is No at operation S108), the process returns to the earlier selector setting (operation S103).

When the value of the frequency counter 122 falls within the range of ±40 ppm (when the answer is Yes at operation S108), the sampling phase-controller 118 determines whether or not the detection signal (Peak detect) of the peak detector 109 indicates the signal presence and the amplitude of a signal output from the Gardner PD 119 has a value substantially equal to and/or larger than a threshold value (operation S109). The signal output from the Gardner PD 119 illustrates the amplitude when an optical signal is input and/or the frequency synchronism is achieved to some extent. Therefore, the signal output from the Gardner PD 119 is monitored to confirm not only the signal input but also the possibility of pulling in the LINE-side synchronism. Consequently, it becomes possible to confirm that a signal is safely input when the switch from the external REFCLK-side synchronism to the LINE-side synchronism is made.

When the peak detector 109 outputs no signal and/or the value of the amplitude of a signal output from the Gardner PD 119 is not substantially equal to and/or larger than the threshold value (when the answer is No at operation S109), the process returns to the determination of the value of the frequency counter 122 (operation S108).

When the peak detector 109 outputs the detection signal and the value of the amplitude of the signal output from the Gardner PD 119 is substantially equal to and/or larger than the threshold value (when the answer is Yes at operation S109), the selector (SEL#1) 123 is set on the PD output #2-side, the selector (SEL#2) 124 is set on the PD output #2-side, and the selector (SEL#3) 128 is set on the loop filter 126's output-side (operation S110). Consequently, the operation state is shifted to the normal operation state where the LINE-side synchronism is attained (operation S111).

Figure 6:
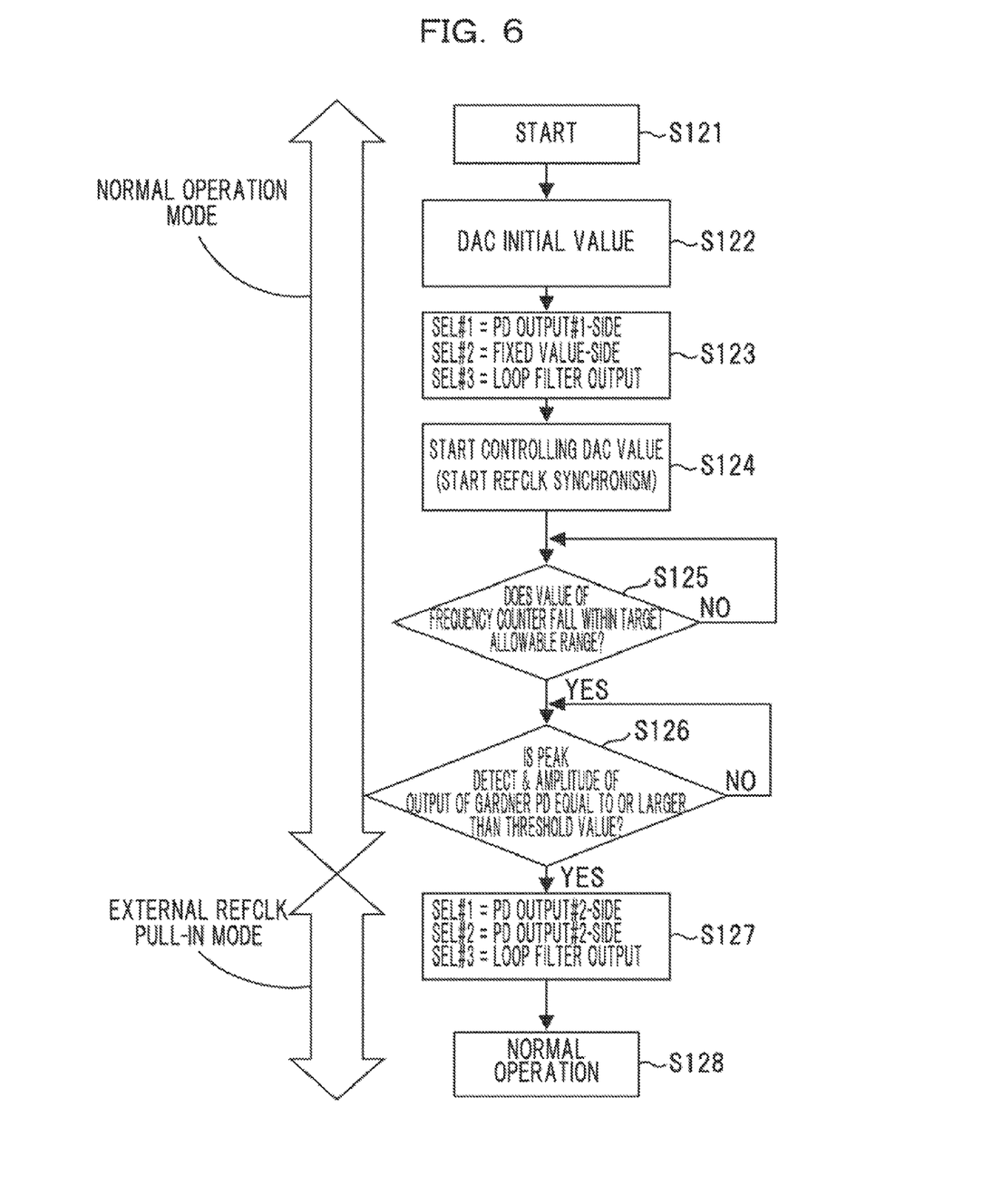
FIG. 6 is a flowchart (Part 2) illustrating different exemplary processes that are performed at the starting time.

FIG. 6 is a flowchart illustrating different exemplary processes that are performed at the starting time. The above-described exemplary processes are performed in the case where a phase detector is prepared, the phase detector using both the phase information acquired from ordinary data and that acquired from signal data generated through a digital signal process, where the phase of the signal data is shifted on purpose. According to the above-described configuration, the values of both the phase information acquired from the ordinary data and that acquired from the signal data, which are output from the phase detector, do not become zero. Therefore, the frequency synchronism may not be displaced on purpose.

In FIG. 6, the optical communication device 100 is started (operation S121), and the sampling phase-controller 118 sets an initial value to the loop filter 126 as the initial value of the DAC 129 (operation S122).

Next, the sampling phase-controller 118 determines to set the selector (SEL#1) 123 on the PD output #1-side, the selector (SEL#2) 124 on the fixed value-side, and the selector (SEL#3) 128 on the loop filter 126's output-side (operation S123).

The sampling phase-controller 118 starts controlling the value of the DAC 129 (operation S124).

First, the sampling phase-controller 118 determines whether or not the value of the frequency counter 122 falls within a target allowable range (operation S125). When the value does not fall within the target allowable range (when the answer is No at operation S125), the above-described determination is made again.

When the value falls within the target allowable range (when the answer is Yes at operation S125), the sampling phase-controller 118 determines whether or not the detection signal (Peak detect) of the peak detector 109 indicates the signal presence and the amplitude of a signal output from the Gardner PD 119 has a value substantially equal to and/or larger than a threshold value (operation S126). When the peak detector 109 outputs no signal and/or the value of the amplitude of the signal output from the Gardner PD 119 is not substantially equal to and/or larger than the threshold value (when the answer is No at operation S126), the above-described determination is made again.

When the peak detector 109 outputs the detection signal and/or the value of the amplitude of the signal output from the Gardner PD 119 is substantially equal to and/or larger than the threshold value (when the answer is Yes at operation S126), the selector (SEL#1) 123 is set on the PD output #2-side, the selector (SEL#2) 124 is set on the PD output #2-side, and the selector (SEL#3) 128 is set on the loop filter 126's output-side (operation S127). Consequently, the operation state is shifted to the normal operation state where the LINE-side synchronism is attained (operation S128).

Figure 7:
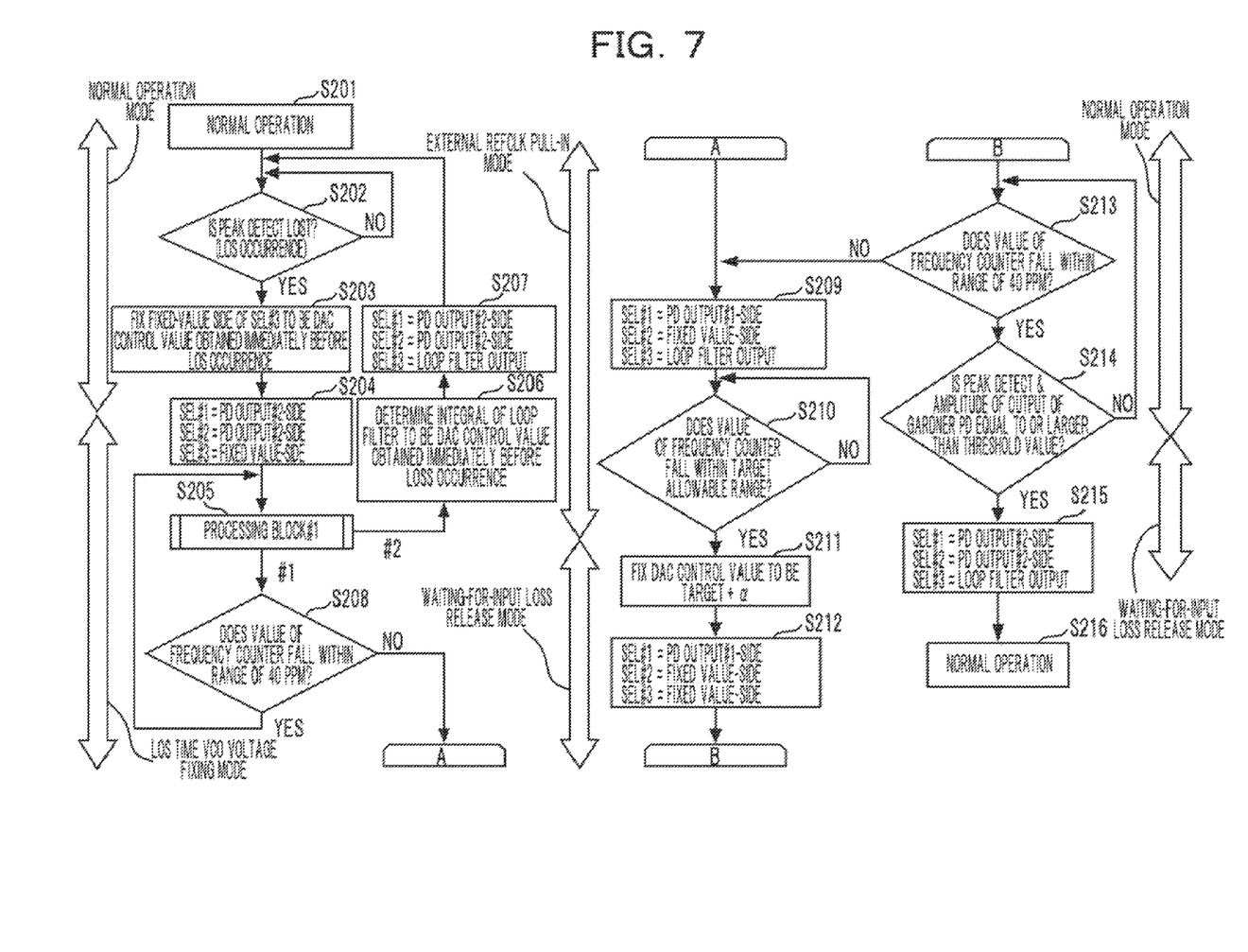
FIG. 7 is a flowchart (Part 1) illustrating exemplary processes that are performed at the signal loss time.

FIG. 7 is a flowchart illustrating exemplary processes that are performed at the signal loss time.

In FIG. 7, the optical communication device enters the normal operation state (operation S201), and the sampling phase-controller 118 determines the occurrence of signal loss (the LOS occurrence) according to whether or not a signal output from the peak detector 109 is lost (operation S202). If the LOS occurrence is not perceived (when the answer is No at operation S202), the above-described determination is made again.

When the LOS occurrence is perceived (when the answer is Yes at operation S202), the fixed value-side of the selector (SEL#3) 128 is fixed through the fixed value-generator 127 so that the fixed value becomes the control value of the DAC 129, the control value being attained immediately before the LOS occurrence (operation S203).

Figure 8:
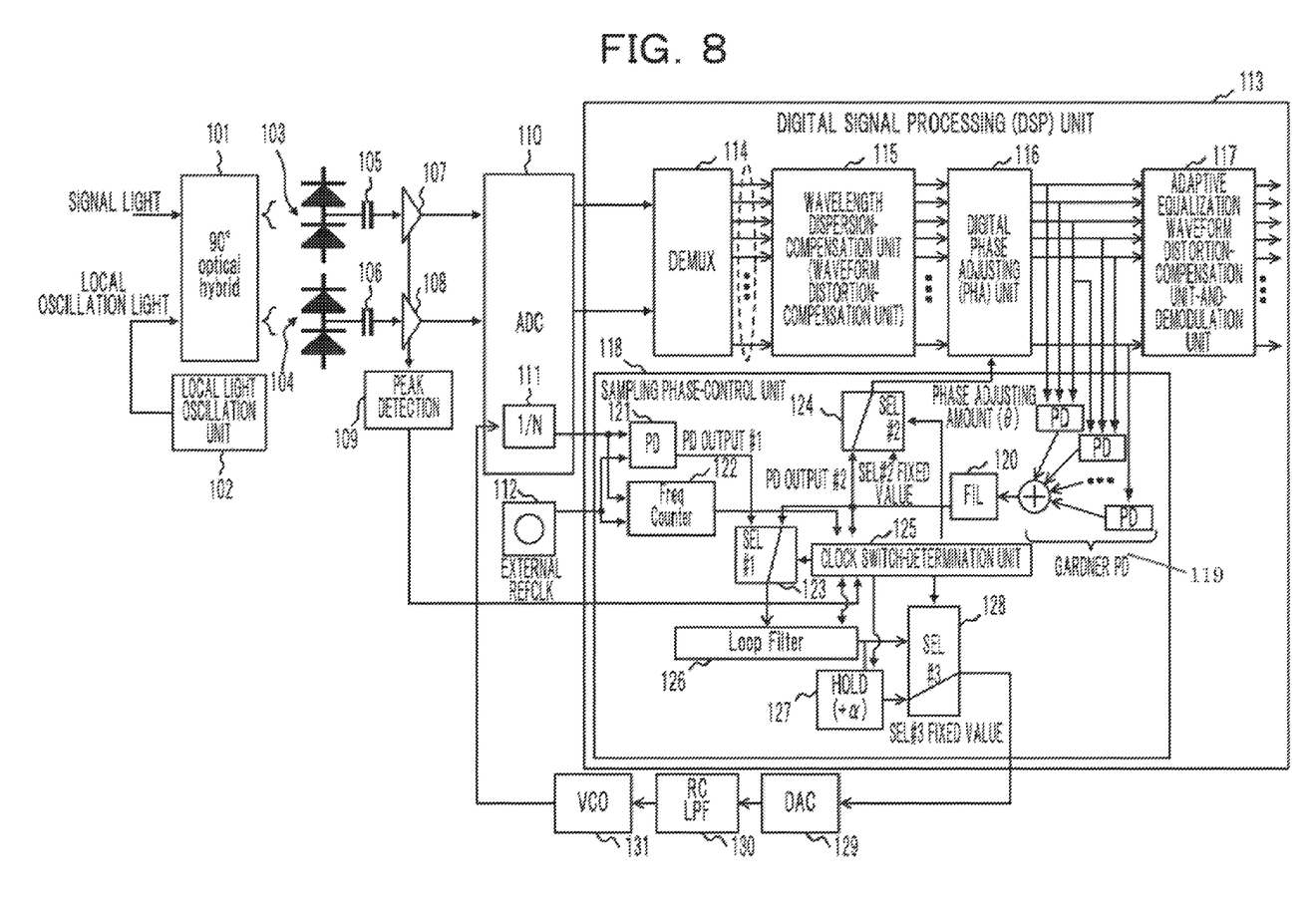
FIG. 8 illustrates the signal flow observed at the signal loss time.

Next, the selector (SEL#1) 123 is set on the PD output #2-side, the selector (SEL#2) 124 is set on the PD output #2-side, and the selector (SEL#3) 128 is set on the fixed value-side (operation S204). FIG. 8 illustrates the signal flow attained in the above-described state. Namely, when the input loss is detected through the peak detector 109, the VCO 131 is fixed. Since the fixed value is determined to be the control value attained immediately before the LOS occurrence, the frequency of the VCO 131 has a value attained before the LOS occurrence, and the phase synchronism is attained in a short time period when the signal light recovers at once. However, when the signal light recovers over time, a frequency oscillated from the VCO 131 is often changed due to a temperature drift or the like. In that case, therefore, it may be difficult to attain the synchronism with LINE-side clock at the optical signal-recovery time. Therefore, the frequency is monitored through the frequency counter 122, and the selector 123 is set on the external REFCLK-side and is temporarily synchronized with the external REFCLK when a value obtained through the frequency monitoring exceeds a threshold value (e.g., ±40 ppm). After that, the switch from the external REFCLK-side synchronism to the LINE-side synchronism is made as is the case with the starting time when the line-side optical signal is input.

Figure 9:
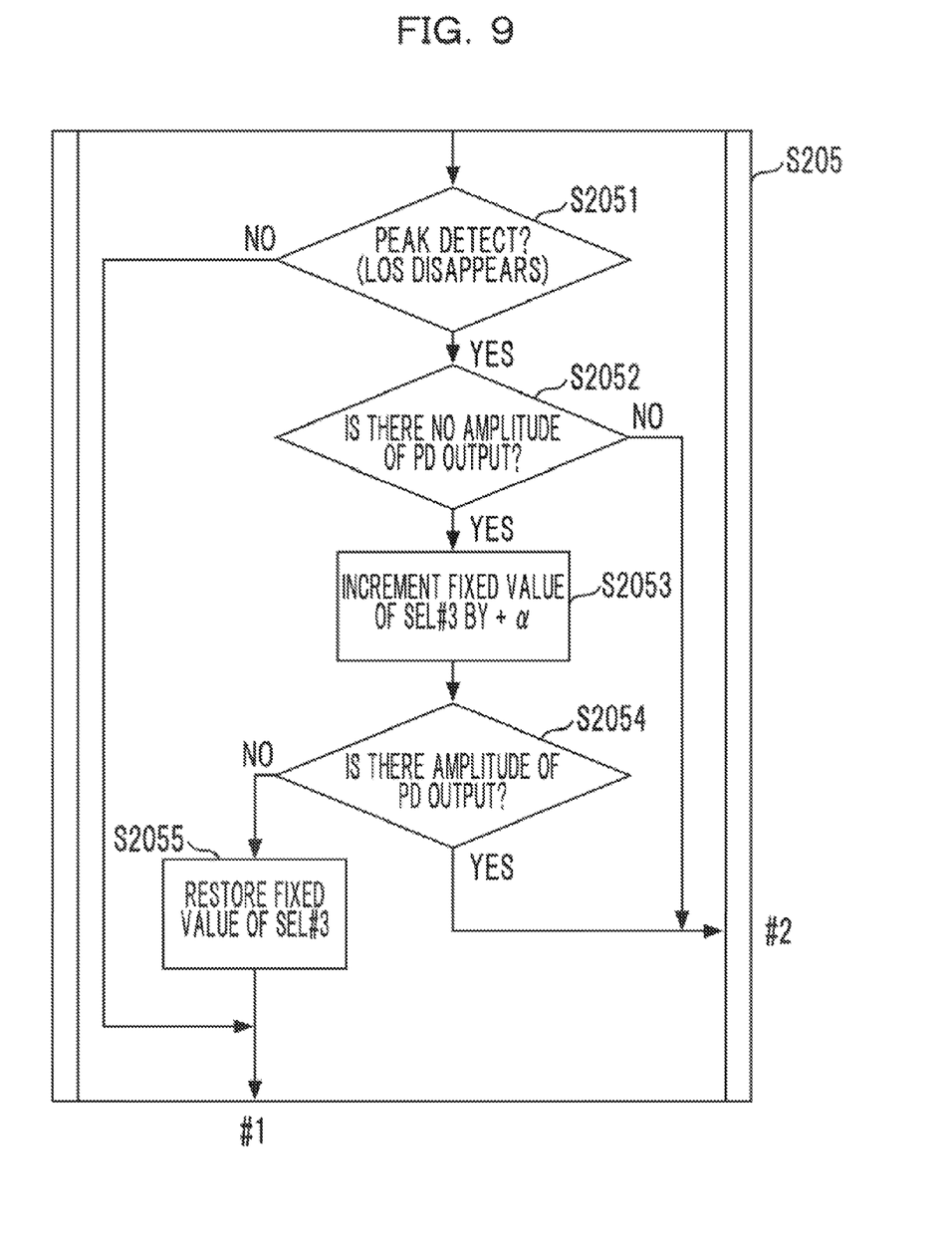
FIG. 9 is a flowchart illustrating exemplary processes that are performed through a processing block #1 (operation S205) illustrated in FIG. 7.

Returning to FIG. 7, the process of a processing block #1 is performed (operation S205). FIG. 9 is a flowchart illustrating exemplary processes that are performed through the processing block #1 (operation S205) illustrated in FIG. 7.

In FIG. 9, the LOS disappearance is determined according to whether or not the detection signal of the peak detector 109 recovers (operation S2051). If the LOS disappearance is not observed (when the answer is No at operation S2051), the process exits from #1.

When the LOS disappearance is observed (when the answer is Yes at operation S2051), it is determined whether or not a signal output from the Gardner PD 119 illustrates an amplitude (operation S2052). When the above-described amplitude is illustrated (when the answer is No at operation S2052), the process exits from #2.

When the signal output from the Gardner PD 119 illustrates no amplitude (when the answer is Yes at operation S2052), the fixed value of the selector (SEL#3) 128 is incremented by +α through the fixed value-generator 127 (operation S2053).

Next, it is determined whether or not a signal output from the Gardner PD 119 illustrates an amplitude (operation S2054). When the above-described amplitude is illustrated (when the answer is Yes at operation S2054), the process exits from #2.

When the signal output from the Gardner PD 119 illustrates no amplitude (when the answer is No at operation S2054), the fixed value of the selector (SEL#3) 128 is restored through the fixed value-generator 127 (operation S2055). Namely, the fixed value-generator 127 decrements the fixed value by +α. Then, the process exits from #1.

Returning to FIG. 7, when the process of the processing block #1 (operation S205) exits from #2, the sampling phase-controller 118 determines the integral of the loop filter 126 to be the control value of the DAC 129 (operation S206), the control value being obtained immediately before the LOS occurrence. In that case, the loop filter 126 is not used for a control loop so that the value of an integrator (not illustrated) provided in the loop filter 126 becomes imprecise. Therefore, when connecting to the DAC 129 in the above-described state, the synchronism may be lost.

Then, the selector (SEL#1) 123 is set on the PD output #2-side, the selector (SEL#2) 124 is set on the PD output #2-side, and the selector (SEL#3) 128 is set on the loop filter 126-side (operation S207). Then, the process returns to the determination of the LOS occurrence (operation S202).

On the other hand, when the process of the processing block #1 (operation S205) exits from #1, the sampling phase-controller 118 determines whether or not the value of the frequency counter 122 falls within the range of ±40 ppm (operation S208). When the value falls within the range of ±40 ppm (when the answer is Yes at operation S208), the process returns to the processing block #1 (operation S205).

When the value does not fall within the range of ±40 ppm (when the answer is No at operation S208), the selector (SEL#1) 123 is set on the PD output #1-side, the selector (SEL#2) 124 is set on the fixed value-side, and the selector (SEL#3) 128 is set on the loop filter 126's output-side (operation S209).

Next, the sampling phase-controller 118 determines whether or not the value of the frequency counter 122 falls within a target allowable range (operation S210). When the value does not fall within the target allowable range (when the answer is No at operation S210), the above-described determination is made again.

When the value of the frequency counter 122 falls within the target allowable range (when the answer is Yes at operation S210), the sampling phase-controller 118 fixes the control value of the DAC 129 at a target value +α (operation S211). At the recovery time, it is confirmed that not only the detection signal of the peak detector 109 but also the amplitude of a signal output from the Gardner PD 119 is perceived. If the phase agrees with the LINE-side phase, the amplitude is not perceived. Therefore, if the output signal of the Gardner PD 119 is not perceived, the fixed value of the selector 128 is temporarily incremented to be a little larger than that obtained immediately before the LOS occurrence. In that way, the output signal of the Gardner PD 119 is confirmed. When the output signal of the Gardner PD 119 is perceived, the LINE synchronism is started again.

Next, the selector (SEL#1) 123 is set on the PD output #1-side, and each of the selector (SEL#2) and the selector (SEL#3) 128 is set on the fixed value-side (operation S212).

Next, the sampling phase-controller 118 determines whether or not the value of the frequency counter 122 falls within the range of ±40 ppm (operation S213). When the value does not fall within the range of ±40 ppm (when the answer is No at operation S213), the process returns to the selector setting (operation S209).

When the value of the frequency counter 122 falls within the range of ±40 ppm (when the answer is Yes at operation S213), the sampling phase-controller 118 determines whether or not the detection signal (Peak detect) of the peak detector 109 indicates the signal presence and the amplitude of a signal output from the Gardner PD 119 has a value substantially equal to and/or larger than a threshold value (operation S214). When the signal of the peak detector 109 is not perceived and/or the value of the amplitude of the output signal of the Gardner PD 119 is not substantially equal to and/or larger than the threshold value (when the answer is No at operation S214), the process returns to the determination of the value of the frequency counter 122 (operation S213).

When the signal of the peak detector 109 is perceived and/or the value of the amplitude of the output signal of the Gardner PD 119 is substantially equal to and/or larger than the threshold value (when the answer is Yes at operation S214), each of the selector (SEL#1) 123 and the selector (SEL#2) 124 is set on the PD output #2-side, and the selector (SEL#3) 128 is set on the loop filter 126's output-side (operation S215). Consequently, the operation state is shifted to the normal operation state where the LINE-side synchronism is attained (operation S216).

Figure 10:
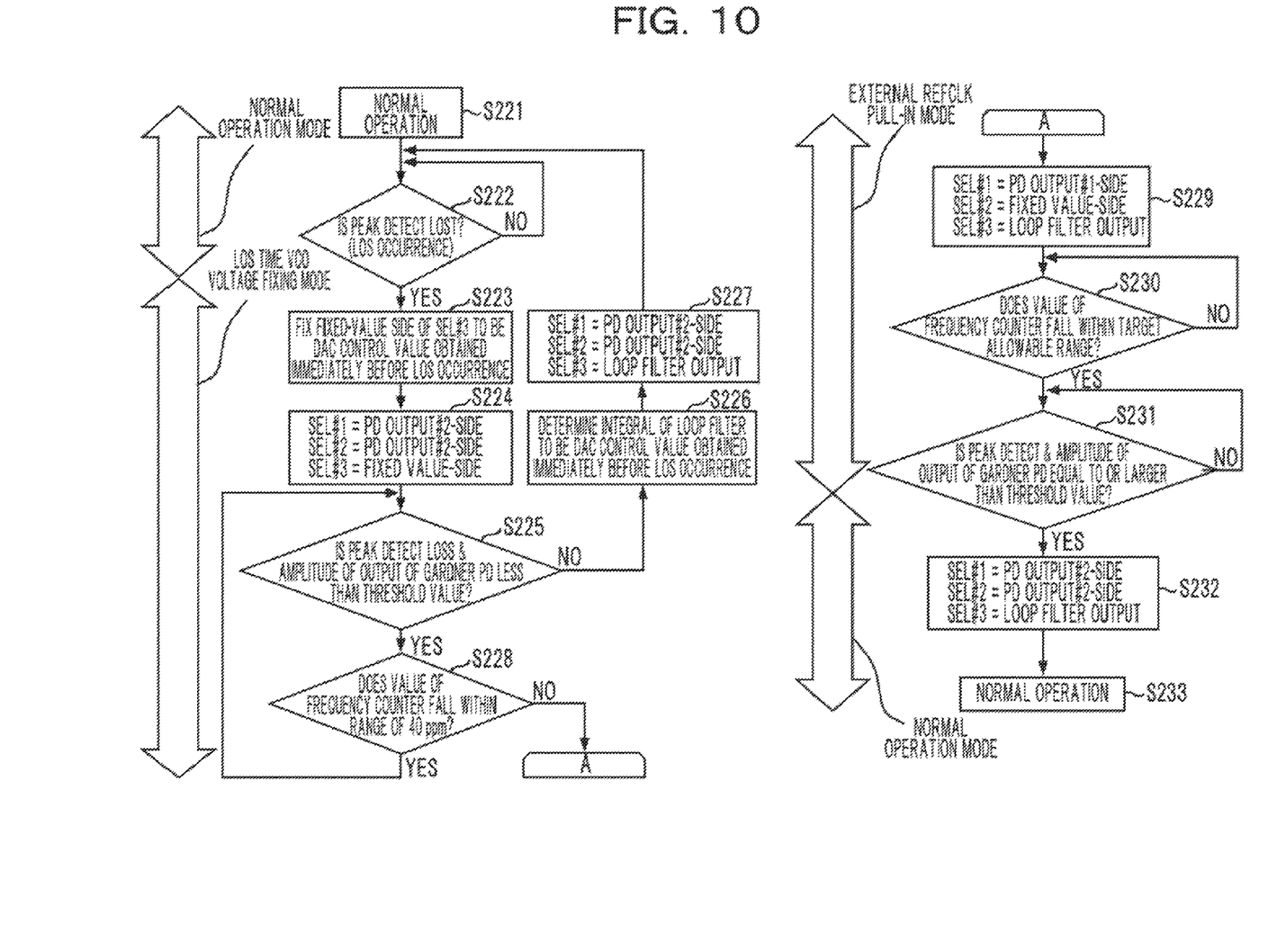
FIG. 10 is a flowchart (Part 2) illustrating different exemplary processes that are performed at the signal loss time.

FIG. 10 is a flowchart (Part 2) illustrating different exemplary processes that are performed at the signal loss time. The above-described exemplary processes are performed in the case where a phase detector is prepared so that the value of a signal output from the phase detector does not become zero in the above-described phase synchronous state.

In FIG. 10, the optical communication device 100 enters the normal operation state (operation S221), and the sampling phase-controller 118 determines the LOS occurrence according to whether or not a signal output from the peak detector 109 is lost (operation S222). If the LOS occurrence is not perceived (when the answer is No at operation S222), the above-described determination is made again.

When the LOS occurrence is perceived (when the answer is Yes at operation S222), the fixed value-side of the selector (SEL#3) 128 is fixed through the fixed value-generator 127 so that the fixed value becomes the control value of the DAC 129, the control value being attained immediately before the LOS occurrence (operation S223).

Next, each of the selector (SEL#1) 123 and the selector (SEL#2) 124 is set on the PD output #2-side, and the selector (SEL#3) 128 is set on the fixed value-side (operation S224).

Next, the sampling phase-controller 118 determines whether or not the detection signal (Peak detect) of the peak detector 109 indicates that the signal is lost and/or the amplitude of a signal output from the Gardner PD 119 has a value less than a threshold value (operation S225).

When the detection signal of the peak detector 109 is perceived and the value of the amplitude of the output signal of the Gardner PD 119 is substantially equal to and/or larger than the threshold value (when the answer is No at operation S225), the sampling phase-controller 118 determines the integral of the loop filter 126 to be a control value of the DAC 129, the control value being obtained immediately before the LOS occurrence (operation S226).

Then, each of the selector (SEL#1) 123 and the selector (SEL#2) 124 is set on the PD output #2-side, and the selector (SEL#3) 128 is set on the loop filter 126-side (operation S227). Then, the process returns to the determination of the LOS occurrence (operation S222).

On the other hand, when the detection signal of the peak detector 109 indicates that the signal is lost and/or the value of the amplitude of the output signal of the Gardner PD 119 is less than the threshold value (when the answer is Yes at operation S225), the sampling phase-controller 118 determines whether or not the value of the frequency counter 122 falls within the range of ±40 ppm (operation S228). When the value falls within the range of ±40 ppm (when the answer is Yes at operation S228), the process returns to the determination of the peak detection signal or the like (operation S225).

When the value does not fall within the range of ±40 ppm (when the answer is No at operation S228), the selector (SEL#1) 123 is set on the PD output #1-side, the selector (SEL#2) 124 is set on the fixed value-side, and the selector (SEL#3) 128 is set on the loop filter 126's output-side (operation S229).

Next, the sampling phase-controller 118 determines whether or not the value of the frequency counter 122 falls within a target allowable range (operation S230). When the value does not fall within the target allowable range (when the answer is No at operation S230), the above-described determination is made again.

When the value of the frequency counter 122 falls within the target allowable range (when the answer is Yes at operation S230), the sampling phase-controller 118 determines whether or not the detection signal (Peak detect) of the peak detector 109 indicates the signal presence and the amplitude of a signal output from the Gardner PD 119 has a value substantially equal to and/or larger than a threshold value (operation S231). When the detection signal of the peak detector 109 is not perceived and/or the value of the amplitude of the output signal of the Gardner PD 119 is not substantially equal to and/or larger than the threshold value (when the answer is No at operation S231), the above-described determination is made again.

When the detection signal of the peak detector 109 is perceived and the value of the amplitude of the output signal of the Gardner PD 119 is substantially equal to and/or larger than the threshold value (when the answer is Yes at operation S231), each of the selector (SEL#1) 123 and the selector (SEL#2) 124 is set on the PD output #2-side, and the selector (SEL#3) 128 is set on the loop filter 126's output-side (operation S232). Consequently, the operation state is shifted to the normal operation state where the LINE-side synchronism is attained (operation S233).

All examples and conditional language recited herein are intended for pedagogical objects to aid the reader in understanding the invention and the concepts contributed by the inventor to furthering the art, and are to be construed as being without limitation to such specifically recited examples and conditions. Although the embodiment(s) of the present inventions have been described in detail, it should be understood that the various changes, substitutions, and alterations could be made hereto without departing from the spirit and scope of the invention.

What is claimed is:

1. An optical communication device using a digital coherent reception system comprising:
    a phase detector configured to generate, based on a signal obtained in a course of digital signal processing, a phase signal indicating a displacement of a sampling of a reception signal;
    a clock switch-determiner configured to switch from an reference clock to a clock of transferred data when a value of an amplitude of the phase signal exceeds a given threshold value; and
    a selector configured to synchronize the sampling of the reception signal and an internal clock of the digital signal processing with the reference clock at start time or signal loss time, and synchronize the sampling of the reception signal and the internal clock with the line clock of the reception signal except for the start time and the signal loss time.

2. The optical communication device according to claim 1, further comprising:
    a peak detector configured to detect whether or not a value of an amplitude of the reception signal exceeds a given value,
    wherein the clock switch-determiner switches from the reference clock to the line clock on condition that the peak detector indicates that the amplitude value of the reception signal exceeds the given value.

3. The optical communication device according to claim 1, further comprising:
    a frequency counter configured to count a frequency of the internal clock,
    wherein the clock switch-determiner switches from the reference clock to the line clock when a frequency indicated by a result of the counting performed through the frequency counter falls within an allowable range.

4. The optical communication device according to claim 1, further comprising:
    a fixed value-generator configured to generate a fixed value with reference to a value of a control voltage of a voltage-controlled oscillator generating the internal clock, the control voltage being obtained at an arbitrary time,
    wherein the clock switch-determiner fixes the control voltage at a target value before switching from the reference clock to the line clock.

5. The optical communication device according to claim 1, further comprising:
    a peak detector configured to generate a detection signal based on a detection of whether or not a value of an amplitude of the reception signal exceeds a given value;

a fixed value-generator configured to generate a fixed value with reference to a value of a control voltage of a voltage-controlled oscillator generating the internal clock, the control voltage being obtained at an arbitrary time; and a frequency counter configured to count a frequency of the internal clock, wherein when a loss of a signal is detected based on the detection signal of the peak detector, the clock switch-determiner fixes the control voltage of the voltage-controlled oscillator at a value obtained immediately before the signal loss occurs through the fixed value-generator, and switches to the reference clock when a frequency indicated by a result of the counting performed through the frequency counter does not fall within an allowable range.

6. The optical communication device according to claim 5, wherein the clock switch-determiner switches from the reference clock to the line clock on condition that the peak detector indicates that the amplitude value of the reception signal exceeds the given value.

7. The optical communication device according to claim 5, wherein the clock switch-determiner switches from the reference clock to the line clock on condition that a frequency indicated by a result of the counting performed through the frequency counter falls within an allowable range.

8. The optical communication device according to claim 5, wherein the clock switch-determiner fixes the control voltage of the voltage-controlled oscillator at a target value before switching from the reference clock to the line clock.

9. A clock switch-control method for an optical communication device that synchronizes a sampling of a reception signal and an internal clock of digital signal processing with a reference clock at start time and/or signal loss time and that synchronizes the sampling of a reception signal and the internal clock with a line clock of the reception signal, except for the start time and signal loss time, by using a digital coherent reception system, the clock switch-control method comprising:

generating, based on a signal obtained in a course of the digital signal processing, a phase signal indicating a displacement of the sampling; and switching from the reference clock to the line clock when a value of an amplitude of the phase signal exceeds a given threshold value.

* * * * *